June 11, 1935. R. J. WATERBURY 2,004,258
RADIATOR AND FRONT FENDER SUPPORT
Filed Dec. 7, 1931 3 Sheets-Sheet 1
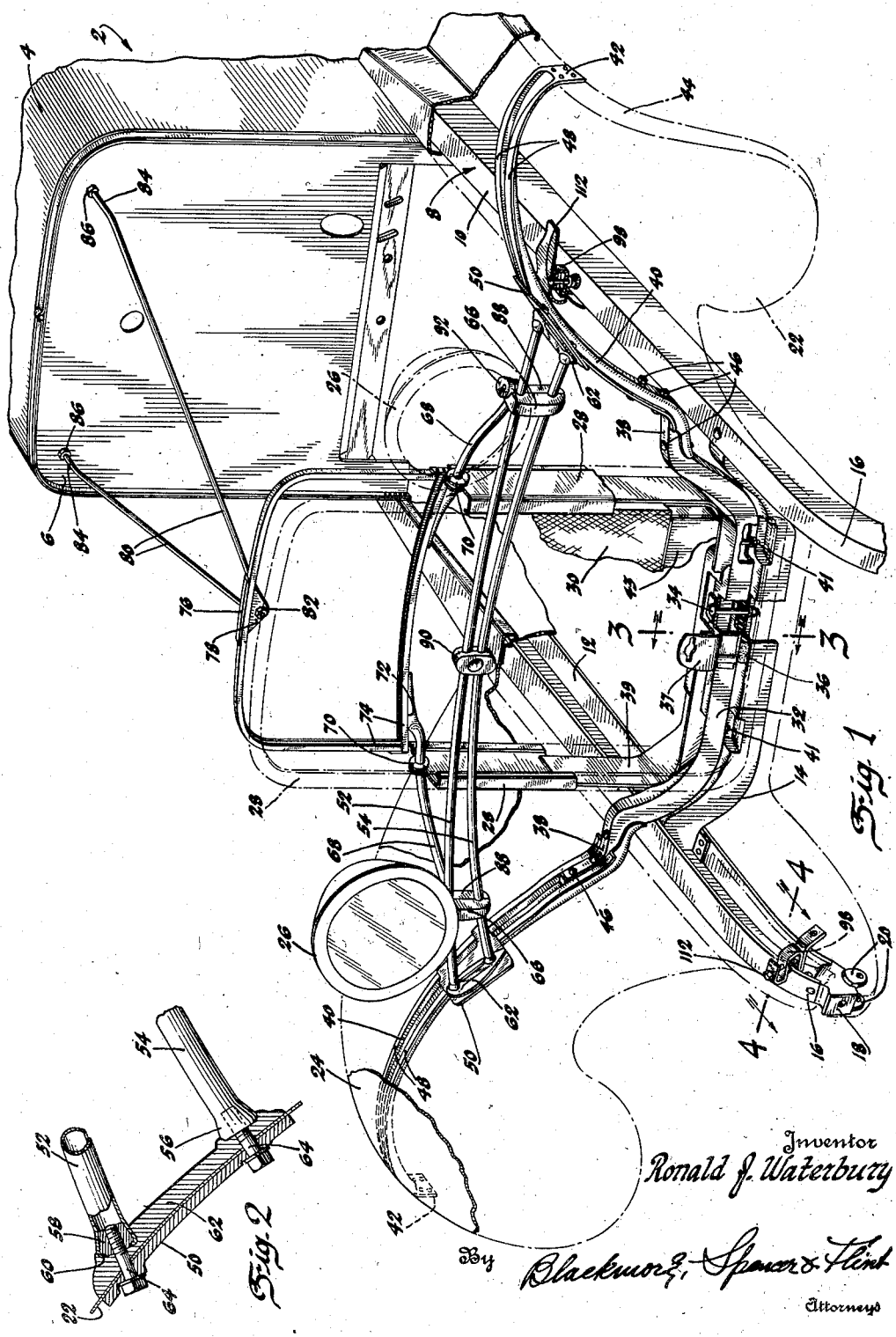

June 11, 1935.    R. J. WATERBURY    2,004,258
RADIATOR AND FRONT FENDER SUPPORT
Filed Dec. 7, 1931    3 Sheets-Sheet 2

Inventor
Ronald J. Waterbury

By Blackmore, Spencer & Hint
Attorneys

June 11, 1935. R. J. WATERBURY 2,004,258
RADIATOR AND FRONT FENDER SUPPORT
Filed Dec. 7, 1931 3 Sheets-Sheet 3
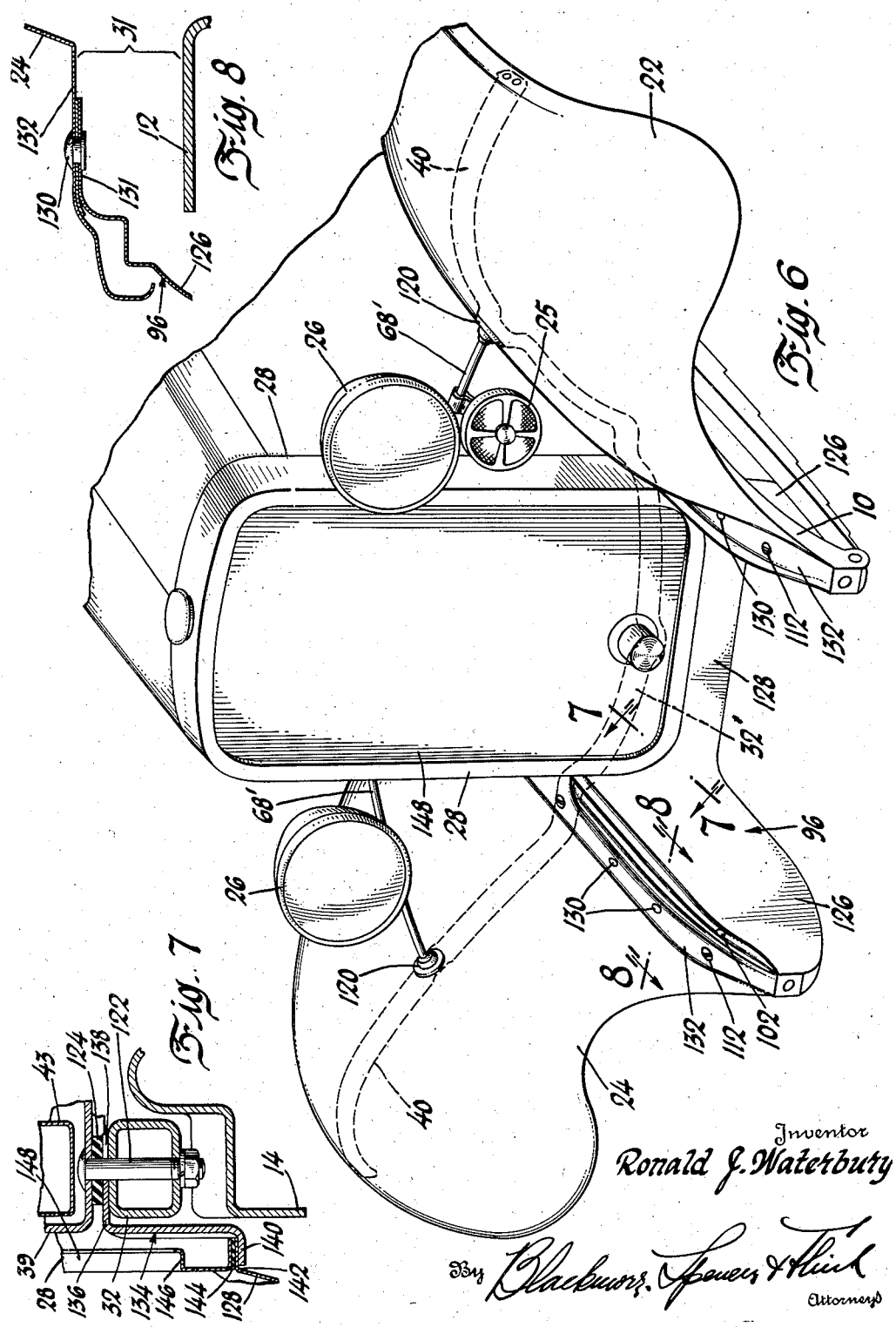

Patented June 11, 1935

2,004,258

UNITED STATES PATENT OFFICE 2,004,258

RADIATOR AND FRONT FENDER SUPPORT

Ronald J. Waterbury, Pleasant Ridge, Mich., assignor to General Motors Corporation, Detroit, Mich., a corporation of Delaware Application December 7, 1931, Serial No. 579,395

17 Claims. (Cl. 280—152)

Primarily this invention relates to automotive vehicles and has particular reference to a unit mounting for the fenders, headlamps, radiator and its splash guard.

In prior constructions, the fenders and radiator with its splash guard have been separately mounted from each other on the chassis frame. In the present invention the fenders, headlamps, radiator and its splash guard are mounted on a support secured to a cross member of the chassis frame at the center or middle of the vehicle. The support comprises a member much similar in appearance to a yoke and is intended to provide a mounting that will prevent axial frame front end twisting from being imparted to such parts as fenders, headlamps, radiator and its splash guard and also the engine compartment hood.

The immediate cause of the side movement of the radiator and front fenders, in the conventional design, is the movement of the front part of frame twisting axially, causing all parts attached to the frame to move with it. It being desired to restrain the movement of the radiator and fenders to the movements of the body, it is logical that the radiator and fenders be carried on an individual support, mounted on the frame and contacting only at the axis of frame movement. This support will act principally in carrying the vertical load of front end sheet metal and radiator. Then, in order to control the side movement of this group, the fenders are braced to the radiator structure which is, in turn, braced to the body dash in the conventional manner. This construction will permit the frame to weave, as usual, without imparting this movement into the fenders and radiator, since these parts rest on the frame only at the axis of its movement. The fenders and radiator are braced, one to the other, preventing their intermovement. The whole group is braced to the dash, correlating its side movement to that of the body.

The support or bracing comprises a brace, preferably of U-shape, which extends between the side bars of the chassis and is mounted at its middle to the middle of a cross member of the chassis frame. To the ends of the U-shaped brace there are secured brace arms which extend outwardly and beneath the fenders. The fenders are secured to the bracing arms and extend thereover and over the U-shaped brace. Each brace arm has secured thereto a bracket or plate, and a pair of brace rods extend from fender to fender and are secured to the bracket as well as to a plate positioned on top of the fender. The rods have applied at their ends a pair of clamps which serve as supports for the headlamps as well as an attaching means for brace rods which extend from the clamps to the interior of the radiator shell. Inside the shell a substantially rectangular frame is fastened which is also secured to the ends of the brace rods. At the upper portion of the rectangular brace, there is secured the usual wishbone or brace rods which extend to the dashboard of the vehicle. The fender bracing holds the fenders in spaced relation to the chassis frame there being an appreciable space between the fender and the frame. In order to avoid the extreme front end of the fender and radiator splash guard from vibrating which might be caused from the comparatively long over-hang and the relatively thin metal employed, the fenders are attached to the chassis frame by means of a resilient connection which allows the chassis frame to move relatively to the fender and also allows one side of the chassis frame to twist relatively to the other without essentially transmitting its warping motion to the fenders.

On the drawings:

Figure 1 shows a perspective view of the front end of an automotive vehicle with the invention applied, parts of the vehicle being omitted for clearer illustration.

Figure 2 is a sectional view of the connection between the ends of the brace rods with the fender.

Figure 6 is a view of the front end of an automobile showing the interrelation of the apron with the fenders, radiator shell and bracing.

Figure 7 is a sectional view taken on substantially the line 7—7 of Figure 6.

Figure 8 is a section on the line 8—8 of Figure 6.

Figure 3:
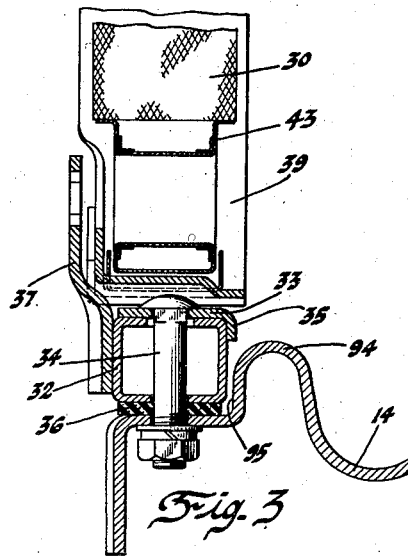
Figure 3 is a section on the line 3—3 of Figure 1.

Referring to the drawings, the numeral 2 indicates an automotive vehicle as a whole. The vehicle has the cowl 4, the dashboard 6, the chassis frame 8 including the side bars 10 and 12, and the transverse cross member 14. The front end of each chassis bar is curved, as indicated at 16, and has the bracket 18 mounted thereon to which the front bumper is secured. The ears 20 on the bracket 18 are for the purpose of mounting the usual spring. The fenders are indicated at 22 and 24 and the headlamps at 26.

The radiator shell is shown at 28 and the core at 30. The radiator splash guard is shown in dotted outline in Figure 1 between the side bars of the chassis and in front of the shell 28. The parts so far described are conventional and per se form no part of the invention.

The fenders 22 and 24 are mounted in spaced relation to the chassis frame as shown at 31 in Figure 8, so that there is no point of contact therebetween. In order to accomplish this, a U-shaped brace 32 of substantially rectangular cross-section is secured by means of two bolts 34 (only one is visible in Figure 1) at its mid portion to the midportion of the transverse cross member 14. A plate 33 is positioned over the brace 32 at the bolts and has a rear flange 35 to strengthen the structure. A front plate 37 is secured to the brace 32 and an opening in the plate is to allow the application of the usual hand starting crank. A radiator core supporting bracket 39 and its core 30 rest on the brace member 32, as shown in Figure 3, and are secured thereto by the bolts and nuts 41. The lower tank is indicated at 43. The member 32 is spaced from the cross member 14 by means of the sound deadening material 36. It will be seen therefore that the brace 32 is resiliently connected to the chassis frame at the surface between the two bolts 34. The radiator splash guard 96 is also secured to the brace 32 and not to the chassis frame at that location. The brace 32 has its ends 38 tapered and terminating in a flat tongue. Secured to the flat tongue and extending around the end 38 of the brace 32 are the brace arms 40 which are channel shaped at their place of union with the ends 38, the channel shape continuing to the end of the brace arms where they are flattened, as indicated at 42, to join on to the edge 44 of the fenders 22 and 24. Suitable bolts and nuts 46 secure the brace arms 40 to the brace 32. The channel of the brace arms 40 preferably has the wide lateral flanges 48 on which the fenders 22 and 24 rest and to which they may be secured in any suitable way, such as by welding. On the drawings the only point of attachment is shown at 42 at the extreme end of the brace arms 40. The brace 32 and the brace arms 40 comprise a support for the fender.

Each brace arm 40 has secured thereto beneath the fender the bracket 50. A pair of brace bars or rods 52 and 54 extend from fender to fender from points over the bracket 50. The brace rods are made of a strip of flat stock rolled into circular form and have their ends flared out, as indicated at 56, to receive a threaded plug 58. The ends are bent back over the plug, as indicated at 60, rigidly to hold them in the rods 52 and 54. Plates 62 are positioned on the fenders over the brackets 50 and bolts 64 pass through aligned openings in the brackets 50, the fenders 22 or 24 and the brackets 62, and are screw-threaded into the plugs 58, as is shown in Figure 2. This structure rigidly braces the fenders relative to each other and with reference to the bracing 32, 40.

Near the ends of the rods adjacent the plates 62, there are mounted on the brace rods the two-part clamps or brackets 66 held together in any suitable way as by machine bolts. One part of the clamp is formed integral with the end of a brace rod 68 which extends from the clamp through a grommet 70 in the side of the radiator shell 28 to the interior of the shell. The end of the brace rod 68 is flattened, as indicated at 72, and has secured to the flattened portion the substantially rectangular brace 74 which is secured to the interior of the radiator shell and conforms in outline thereto. The brace 74 is preferably channel shape in cross section. At the top portion of the radiator shell, the brace 74 has the bracket 76 secured thereto, the bracket having an ear 78 provided with a suitable opening and in this opening there are secured the ends of the brace rods 80 of the wishbone type, the nut 82 rigidly holding the braces 80 on the ear 78. The opposite ends 84 of the brace rods 80 are secured to the dashboard in the usual way, as indicated at 86. At their midportion the brace rods 52 and 54 are secured together by means of a two-part clamp 90.

The rear portion 88 of clamps 66 also has formed thereon the socket 92 in which there is received a shank for mounting the headlamps 26.

By referring to Figure 3, it will be seen that the transverse cross member 14 of the chassis frame has an upwardly bent portion 94 to serve as a reinforcing for the cross member as well as an abutment against which the cross brace 32 will strike if it is pushed rearwardly for any reason, such as in case of an accident. The upwardly bent portion or rib 94 will prevent the rearward movement of the brace 32 beyond the edge 95 thereof.

Figure 4:
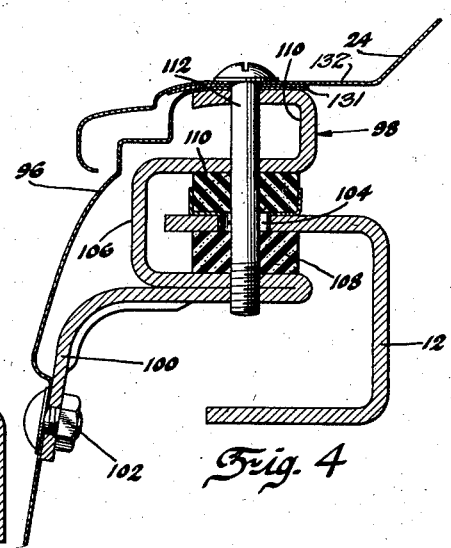
Figure 4 is a section on the line 4—4 of Figure 1.

By referring to Figure 4, it will be noted that the fenders 24 and the splash guards 96 do not rest on or contact with the chassis. In the space therebetween, there are positioned the brackets 98. Each bracket 98 is of the shape shown in Figure 4 and has the lower arm portion 100 to which the splash guard is secured by means of the bolt and nut 102. The chassis frame has an opening 104 and the bracket 98 has a U-shaped portion 106 which fits on the upper web of the chassis. Rubber washers or blocks 108 and 110 are positioned above and below the web of the chassis and are received within the U-shaped portion 106. A second U-shaped portion 110' at the upper portion of the bracket extends up to the fender 24 and the edge of the fender as well as the edge of the splash guard 96 rest thereon. Suitable openings in the edges of the guard and fender and in the member 98 allow the bolt 112 to pass therethrough and through the rubber blocks. The bolt is screwthreaded into the lower portion of the bracket 98. The opening 104 is considerably over-size so that if either of the side bars twist or move relatively to the other, the rubber will allow for a considerable limited movement of the chassis bar without transmitting the motion to the fenders and braces. As many of the mountings (shown in Figure 4) as desired may be used. Preferably two are used on each side, one in the extreme forward end of the front fender and one substantially at the midpoint between the fender and the dashboard.

Figure 5:
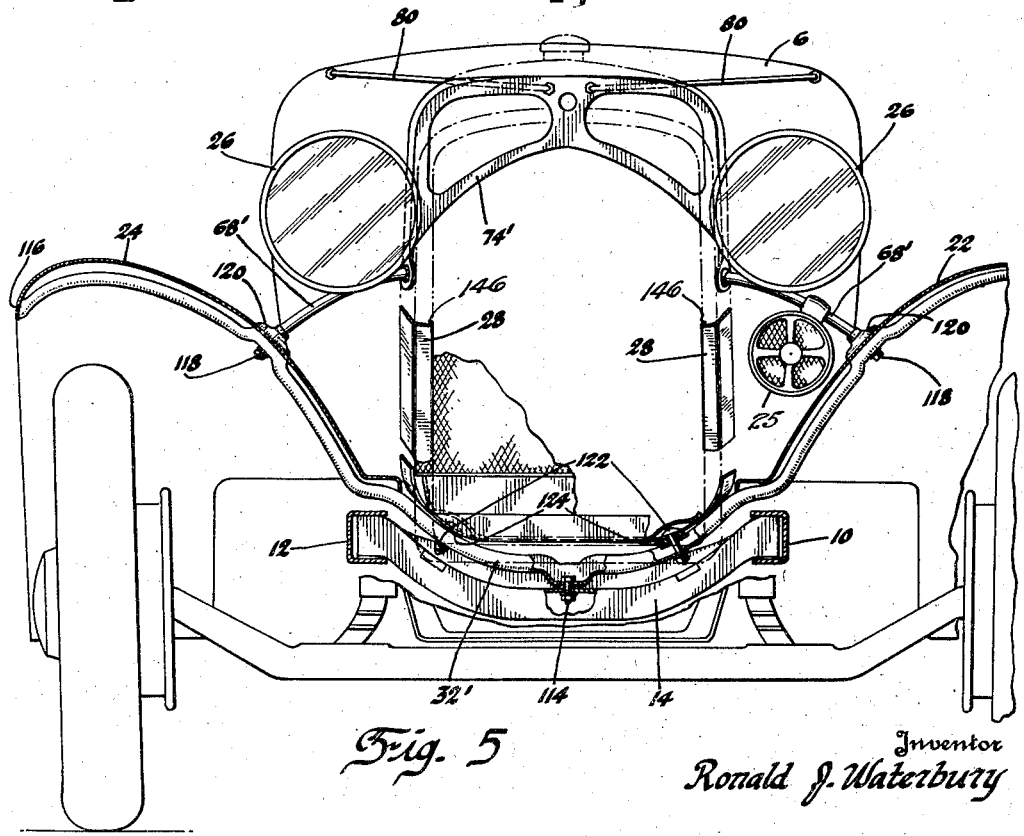
Figure 5 is a front view of a modification.

Referring to the modification of Figure 5, the side bars 10 and 12 of the chassis have the cross member 14 to which there is secured at its midpoint, as shown at 114, a single brace 32' which extends upwardly and outwardly and is attached to the outer portion of the fender at 116. The brace rod has the fenders 22 and 24 mounted thereon but there is omitted the brace rods 52 and 54 of Figure 1.

Brackets 120 have mounted therein and secured thereto by the bolts 118 the brace rods 68' which pass through grommets at the side of the radiator shell 28 and interiorly of the shell are secured to the brace member 74' which is shaped to conform to the interior of the shell and is secured thereto. To the upper portion of the brace member 74', the brace rods 80 are secured, their rear ends being secured to the dashboard 6 in the usual way.

The headlamps 26 have suitable shanks on the rear thereof and are mounted in sockets secured to the braces 68'. This structure is not seen in the figure. A horn 25 is shown at the right of Figure 5 secured to the brace 68'.

The radiator shell 28 is secured to the brace 32' by means of the bolts and nuts 122, the rubber blocks 124 being used as sound insulation.

Instead of the braces 80 extending to the dashboard, they may be secured to the engine block to accomplish the same result. However, in instances where the engine is mounted in rubber, the bracing to the engine is not satisfactory because there is too much movement or side play to the engine.

It is also within the scope of the invention to brace the rear fenders in substantially the same way as the front fenders.

In Figures 4, 6, and 7, the interrelation of the splash guard 96 with the chassis, fenders, radiator shell and bracing is shown. The apron 96 is a continuation of the fenders 22 and 24 and comprises the vertical side panel portions 126 extending forwardly and downwardly of the radiator shell. These panels 126 conceal a part of the front end of the chassis and prevent mud, rocks, etc. striking the vehicle, and add a finished appearance to the front end. The panels 126 are connected by a cross member 128 extending downwardly in front of the radiator at the lower end thereof. The panels 126 of the apron 96 have flanges 131 which are secured to the flanges 132 of the fenders 22 and 24, as shown in Figures 4 and 8, by the bolt 112 and by the rivets 130, respectively.

In Figure 7 there is shown the specific manner in which the cross member 128 of the apron is secured to the brace 32. Two irons 134 are used, one at each bolt 122 (or 41). Each iron has an upper right angularly bent forked arm 136 the tines 138 of the fork straddling the bolts 122, and a lower right angularly bent arm 140 to receive a flange 142 on the cross member 128. The tightening of the nuts on the bolts 122 secures the upper arms 136 while the flange 142 may merely either rest on the arms 140 or be riveted or welded thereto. Preferably a piece of fabric 144 is placed between each arm 140 and the shell 28.

The radiator shell 28 is inwardly flanged as at 146 and the usual grille or stone guard 148 (Figure 6) is received in the shell back of the flange.

I claim:

1. In a bracing and mounting means for the headlamps, radiator and front fenders of a vehicle having a chassis frame, a cross member between the side bars of the frame, a brace secured at its middle to said cross member, brace arms secured to the ends of said brace and extending under the fenders and secured thereto, a cross rod extending from fender to fender and secured to the fender brace arms, a clamp secured to the brace rod, means extending from the clamp to the radiator shell to brace the radiator, and a headlamp secured to the clamp.

2. In a bracing and mounting means for the radiator and front fenders of a vehicle having a chassis frame, a cross member between the side bars of the frame, a brace secured at its middle to said cross member, brace arms secured to the ends of said brace and extending under the fenders and secured thereto, a cross rod extending from fender to fender and secured to the fender brace arms, a second brace extending from the rod and terminating inside the radiator shell, and a third brace secured to the inside of the radiator shell and to the second brace.

3. In a bracing and mounting means for the radiator and front fenders of a vehicle having a dashboard and a chassis frame, a cross member between the side bars of the frame, a brace secured at its middle to said cross member, brace arms secured to the ends of said brace and extending under the fenders and secured thereto, a cross rod extending from fender to fender and secured to the fender brace arms, a second brace extending from the rod and terminating inside the radiator shell, a third brace secured to the inside of the radiator shell and to the second brace, and brace rods extending from the third base to the dashboard.

4. In a bracing means for the fenders and radiator of vehicles, a rod extending between the fenders and secured thereto at its ends, a plurality of brackets mounted on the rod, braces secured to the brackets and extending through the radiator shell, and a brace inside the radiator shell and secured to the first-mentioned braces.

5. In a bracing means for the fenders and radiator of vehicles having a dashboard, a rod extending between the fenders and secured thereto at its ends, a plurality of brackets mounted on the rod, braces secured to the brackets and to the radiator shell, a brace inside the radiator shell and secured to the first-mentioned braces, and a plurality of rods extending from the inside brace to the dashboard.

6. In a bracing means for the fenders and radiator of a vehicle having a dashboard, means to connect the fenders to each other, a plurality of brackets mounted on said means, braces secured to the brackets and to the radiator shell, a brace secured to the shell and to said first-mentioned braces, and bracing means connecting the dashboard to the radiator shell.

7. In a flexible bracing and mounting means for the fenders of a vehicle having a chassis, a cross member between the side bars of the chassis, a support extending over the cross member and under the fenders, means including rubber flexibly to connect said support at a short surface to the cross member only, said fenders secured to said support to hold the fenders in spaced relation and flexibly connect them to the chassis, said fenders flexibly connected to the chassis at their front, and an apron connected to the fenders at the front portion thereof, said apron secured to said support.

8. In a mounting means for the front fenders of a vehicle having a chassis and a radiator, a support flexibly connected at its middle only to the chassis and extending under the fenders and secured thereto, braces between the support and radiator and secured to both, and a brace secured to the upper part of the radiator and to the said braces to reinforce the radiator.

9. In a mounting means for the front fenders of a vehicle having a chassis, a dashboard and a radiator, a support flexibly connected at its middle only to the chassis and extending under the fenders and secured thereto, braces between the support and radiator and secured to both, a brace secured to the upper part of the radiator and to the said braces to reinforce the radiator, and brace rods extending between the radiator braces and the dash board.

10. In a bracing and mounting means for the radiator shell and front fenders of a vehicle having a chassis, a cross member between the side bars of the chassis, a support extending over and resiliently mounted at its middle on said cross member and extending under the fenders and radiator, a guard extending forwardly of the radiator and rigidly secured to the fenders, said fenders and radiator shell being directly and rigidly secured to said support, said fenders and guard spaced from the chassis and out of contact therewith.

11. In a flexible bracing and mounting means for the fenders of a vehicle having a chassis and a radiator shell, a cross member between the side bars of the chassis, a support extending over the cross member and under the fenders, means including rubber flexibly to connect said support at its middle to the cross member, a guard extending forwardly of the radiator and rigidly secured to the fenders, said fenders secured to said support to hold the fenders in spaced relation and flexibly to connect them to the chassis, said support, guard, and fenders being rigidly interconnected.

12. In a flexible bracing and mounting means for the fenders, radiator and radiator shell of a vehicle having a chassis, a cross member between the side bars of the chassis, a support extending over the cross member and under the fenders, means including rubber flexibly to connect said support at its middle to the cross member, a guard rigidly secured to and forming a continuation of the fenders and extending forwardly of the radiator, said fenders secured to said support to hold the fenders in spaced relation and flexibly to connect them to the chassis, said radiator secured to the support and movable therewith, said fenders, guard, support and radiator shell being rigidly secured together.

13. In a flexible bracing and mounting means for the fenders, radiator and radiator shell of a vehicle having a chassis, a cross member between the side bars of the chassis, a support extending over the cross member and under the fenders, means including rubber flexibly to connect said support at its middle to the cross member, said fenders secured to said support to hold the fenders in spaced relation and flexibly connect them to the chassis, means forming a continuation of the fenders and extending between the fenders in front of the radiator and secured to the fenders, said radiator secured to the support and movable therewith, said means, fenders, brace and radiator shell being rigidly secured together.

14. In combination, a chassis, a radiator shell, an apron extending in front of the normal position of the radiator proper and having vertical upstanding side portions, said vertical upstanding portions spacedly carried at either side of said radiator shell, fenders on each side of said radiator shell, means rigidly to interconnect said fenders to said shell, said fenders being secured to said vertical upstanding side portions, and means to hold said fenders and apron out of contact with the chassis.

15. In combination, a chassis, upstanding panel members spacedly carried thereby, a radiator shell carried by said chassis between said panels, said panels being formed with flanges and projecting ahead of the normal position of the radiator shell, fenders mounted at each side of said shell and secured to the flanges of said panel members, and means to hold said fenders and panel members out of contact with the chassis.

16. In combination, a chassis, upstanding panel members spacedly carried thereby, a radiator shell carried by said chassis between said panel members, said panels projecting forwardly and downwardly and having flanges, said flanges extending forwardly of said radiator shell, fenders arranged at either side of said radiator shell, means rigidly to secure together the flanges, the radiator shell and said fenders, and means to hold said fenders and panel members out of contact with the chassis.

17. In combination, a vehicle having a chassis, a radiator and a radiator shell carried by said chassis, a guard in front of the radiator shell concealing a portion of the front end of the chassis and that part of the vehicle immediately below the radiator shell, fenders at the sides of the radiator shell, said fenders secured to said guard, said guard and fenders forming continuations of each other, means to hold said fenders spaced from and out of contact with the chassis for substantially their entire length, and means rigidly to interconnect said fenders, guard and radiator shell.

RONALD J. WATERBURY.